United States Patent [19]

Swann et al.

[11] Patent Number: 5,046,429
[45] Date of Patent: Sep. 10, 1991

[54] IGNITION MATERIAL PACKET ASSEMBLY

[75] Inventors: Timothy A. Swann; John D. Skouson, both of Mesa, Ariz.

[73] Assignee: Talley Automotive Products, Inc., Phoenix, Ariz.

[21] Appl. No.: 515,820

[22] Filed: Apr. 27, 1990

[51] Int. Cl.$^5$ .............................................. B60R 21/28
[52] U.S. Cl. .................................. 102/530; 280/741
[58] Field of Search ............... 280/741, 736; 102/530, 102/531, 204, 202.5, 202

[56] References Cited

U.S. PATENT DOCUMENTS

| | | | |
|---|---|---|---|
| 3,695,179 | 10/1972 | Rainone et al. | 280/741 |
| 3,971,320 | 7/1976 | Lee | 102/202.9 |
| 4,062,288 | 12/1977 | Millray | 102/531 |
| 4,315,462 | 2/1982 | Vollers | 102/204 |
| 4,386,567 | 6/1983 | Ciccone et al. | 102/202.5 |
| 4,429,632 | 2/1984 | Yunan et al. | 102/204 |
| 4,547,342 | 10/1985 | Adams et al. | 102/531 |

*Primary Examiner*—Michael J. Carone
*Attorney, Agent, or Firm*—Tarolli, Sundheim & Covell

[57] ABSTRACT

An ignition material packet assembly which comprises: (1) a first cup-shaped member having an open top, formed of an engineering thermoplastic for electrically insulating a pyrotechnic material stored within the assembly, (2) a second cup-shaped member inserted at least partially within the outer plastic member and retained therein by a friction fit created therebetween such that a compression gap is formed between a corresponding base portion of the first and second cup-shaped members, wherein the second cup-shaped member has an open top and is formed of a lightweight metal; (3) a pyrotechnic material comprising a mixture of an ignition enhancing material and an autoignition material sealed within the metal cup member and (4) a metal lid member closing the open top of the inner cup member to hermetically seal the pyrotechnic material therein.

11 Claims, 1 Drawing Sheet

IGNITION MATERIAL PACKET ASSEMBLY

TECHNICAL FIELD

The invention relates to an improved ignition material packet for use in an inflatable motor vehicle passive safety device, and more particularly to a hermetically sealed, electrically insulated ignition material packet assembly forming a portion of the ignition train for a pyrotechnically actuated passive restraint device.

BACKGROUND OF THE INVENTION

Numerous forms of pyrotechnic gas generators, i.e., inflators, are known in the prior art. These inflators, as a class, are typically capable of producing a large volume of gas at a low temperature within a short period of time by the combustion of a solid pyrotechnic gas generant material. The gas thus produced is used, for example, to rapidly expand an inflatable restraining structure, such as an air bag, within a motor vehicle to protect the driver and/or passengers in the event of a collision involving the vehicle.

Inflators presently in use typically include an inner ignition chamber containing means for igniting the solid gas-generating composition and a surrounding combustion chamber wherein the main propellant charge is stored prior to the actuation of the inflator. The combustion of the main charge also takes place within the combustion chamber. The typical inflator further comprises means, located outwardly of the combustion chamber, adapted for cooling and filtering the gaseous combustion products produced by the combustion of the main propellant charge. The cooled and filtered gas then exits from the inflator housing through a plurality of diffuser ports spaced along the periphery thereof and enters and inflates an air bag associated therewith.

The most common means for initiating combustion of the main propellant charge within a pyrotechnic inflator of the type described above is an electrically actuated squib device. Such squibs are typically located within the ignition chamber of the inflator. An example of a squib useful for such an application is set forth in U.S. Pat. No. 3,971,320 to Lee, which discloses a device comprising a nonconductive, i.e., plastic outer case and a metallic inner cup, to minimize the danger of accidental firing by discharge of static electricity or by short circuits.

Typically, the squib is operatively associated with at least one sensing device, of a type well-known in the art, positioned at a remote location upon the body of the vehicle. Sensors of the type commonly in use are adapted to respond to a sudden deceleration in the progress of the vehicle as would normally occur in a collision between the vehicle and another object. Upon a determination that such a collision is imminent, the sensor typically transmits an electrical signal through one or more connecting wire leads to the squib, which results in the combustion of a small pyrotechnic charge located within the body of the squib. The hot gasses and particulates produced upon the ignition of the squib are then directed through ports in the structural members defining the ignition chamber of the inflator, so as to impinge upon the main propellant charge, thus causing it to ignite in turn.

The ignition train described above often additionally includes a packet formed, for example, of aluminum, containing a material such as boron potassium nitrate ($BKNO_3$) for enhancing the ignition of the main propellant charge. The $BKNO_3$ material burns with a very hot flame that is suitable for igniting the solid main propellant. This packet is typically positioned within the ignition zone of the inflator device and maintained in position adjacent the initiator means by some type of spring clip arrangement. Examples of such an ignition packet are described in U.S. Pat. Nos. 4,547,342 to Adams et al and 4,722,551 to Adams.

While the boron potassium nitrate is very successful under normal conditions in igniting the main propellant charge, it does suffer from a serious deficiency in that the autoignition temperature of the $BKNO_3$ is extremely high, i.e., from about 600–700° F. Since the compositions typically chosen for the main propellant charge ignite at an even higher temperature, in the conditions normally encountered, for example, in a car fire, the material within the ignition packet would have to reach a temperature of in excess of 600° F. before it would ignite and thus ignite the main propellant charge.

In this situation, the generator housing would be subjected to even higher temperatures, i.e., in the range of from 800–900° F. Under such conditions, due to laws of temperature and pressure well known to those skilled in the propellant art, the main propellant charge would burn very rapidly and generate gas at an extremely high pressure, thus creating a situation wherein an explosive fragmentation of a heat-weakened generator housing is a distinct possibility. This fragmentation would be even more likely to occur in inflators having housings formed of aluminum, such as those currently being sold by a number of manufacturers in order to permit a reduction in the weight of the inflator unit.

As described in U.S. Pat. No. 4,561,675 to Adams et al., manufacturers have therefore begun to incorporate an additional pyrotechnic composition, i.e., an autoignition material, into the ignition packet in combination with the $BKNO_3$. This additive must remain stable over an extended period and must autoignite at a temperature lower than the $BKNO_3$, (about 350° F.). The ignition of this material at 350° F. causes the $BKNO_3$, and therefore the main propellant charge, to ignite at temperatures significantly lower than the 600–700° F. range disclosed above. As a result, the main propellant charge would burn at a much slower rate and at a significantly lower pressure. Thus, the end effect of adding an autoignition material to the $BKNO_3$ ignition enhancing composition is to prevent weakening of the inflator housing which otherwise would occur at elevated temperatures (such as those encountered in a car fire), most particularly in aluminum inflators. This, in turn, diminishes the chance of an explosive overpressurization in the event of such a car fire.

The utilization of such prior art ignition material packets is, however, subject to several drawbacks. $BKNO_3$, for example, is known to be a hygroscopic material. It therefore must be hermetically sealed within the packet to prevent contamination by atmospheric moisture. Such a seal is not always obtainable, however, with the materials and methods utilized in the prior art. As a result, an inflatable occupant restraint device associated with an inflator incorporating such a prior art packet may fail to properly deploy if the ignition train is interrupted or slowed due to contamination of the pyrotechnic materials with water vapor.

Moreover, prior art ignition material packets have either been constructed entirely of plastic or of metal. As discussed above, an all plastic assembly may not be or may not remain hermetically sealed, and thus the material within the packet may be contaminated with moisture to its detriment. Alternately, an all metal assembly requires the provision of an additional barrier between the surrounding metal inflator housing and the ignition material packet in order to prevent a premature initiation of combustion due to the presence of stray electrical charges or short circuits within the inflator unit.

SUMMARY OF THE INVENTION

It is therefore an object of the present invention to provide an improved ignition material packet assembly wherein the ignition enhancing and autoignition materials are hermetically sealed in a corrosion-resistant container to protect them from the degerative effects of atmospheric moisture.

Another object of the present invention is to provide an improved ignition material packet assembly having an outer plastic surface which serves to electrically insulate the pyrotechnic material stored within the assembly from stray electrical charges produced within the inflator.

It is a further object of the present invention to provide an improved ignition material packet assembly comprising an inner metal cup-shaped member at least partially inserted within an outer plastic cup-shaped member wherein a compression gap is maintained between the base portion of the corresponding cup-shaped members. This compression gap facilitates maintaining an intimate contact between the assembly and a pyrotechnic initiator, i.e., a squib, located adjacent thereto during the installation of applicants, packet assembly within a pyrotechnic inflator device.

The ignition material packet assembly of the present invention thus comprises a first, outer cup member formed of an engineering thermoplastic such as polypropylene, polyethylene or nylon adapted for electrically insulating a pyrotechnic material stored within the assembly. The outer cup member comprises a base, a sidewall coextensive with the base and formed integral therewith, and an open top.

A second, inner cup member, having the same shape as the outer cup member, is formed, in one embodiment, of a metal having a relatively high corrosion resistance, such as stainless steel. In an alternate embodiment, the inner cup member may be fabricated from a lightweight metal material such as aluminum. The metal cup member is inserted at least partially within the open top of the outer plastic cup member with its open top facing in the same direction as that of the outer cup. A pyrotechnic material is hermetically sealed within the metal cup member by a lid member extending across the open top of the metal cup which is secured to the sidewalls thereof.

The inner metal cup member is maintained within the plastic outer cup member by a friction fit created therebetween upon formation of the packet assembly. A slight gap, referred to as a "compression gap", is maintained between the base portion of the first and second cup members to facilitate maintenance of an intimate contact between the lid member of the metal cup member and a pyrotechnic initiating device such as a squib located adjacent thereto.

In one embodiment of the present invention, the lid member is welded to the sidewall of the inner metal cup member to form the hermetic seal. The lid member may be configured, i.e., indented, to correspond to the shape of an upper portion of an adjacent initiating squib to facilitate contact relation of the squib with the lid member. Moreover, at least a portion of the lid member in contact with the squib may be coined, i.e., made thinner than the surrounding lid portion, to facilitate the combustion of the pyrotechnic material within the inner metal cup member upon actuation of the squib.

In a further embodiment of the invention, the pyrotechnic material stored within the metal inner cup comprises a mixture of an ignition enhancing material, such as boron potassium nitrate ($BKNO_3$) and an autoignition material capable of igniting at a temperature substantially below that of the $BKNO_3$. This autoignition material is typically a smokeless powder. Both the ignition enhancing material and the autoignition material are stored within the inner metal cup member in powdered form to provide the maximum available burning surface.

DETAILED DESCRIPTION OF THE PREFERRED EMBODIMENT

Figure 1:
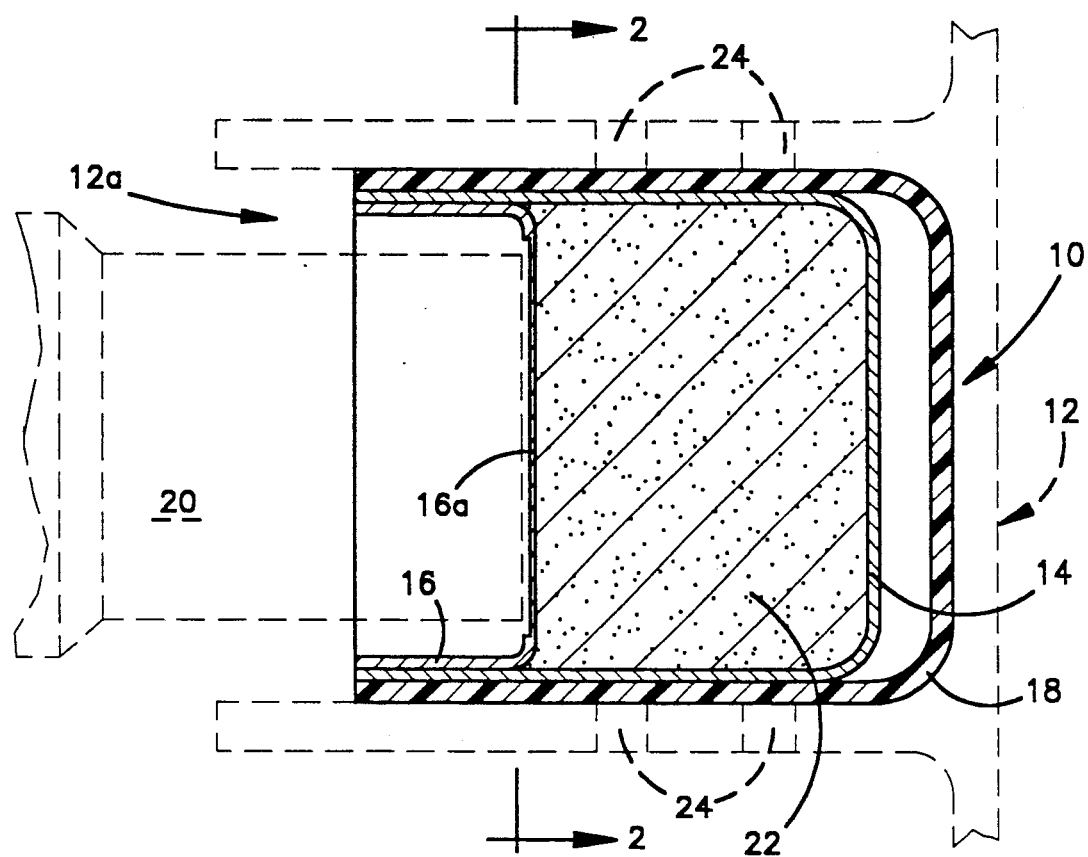
FIG. 1 is a view in cross-section of the ignition material packet assembly of the present invention with surrounding parts shown in phantom.

Turning initially to FIG. 1 there is illustrated ignition material packet assembly 10 of the present invention (hereinafter designated "assembly 10"). Assembly 10 is normally positioned as shown within ignition chamber 12a of the inflator housing, bounded along its outer surface by diffuser member 12 (a portion of which is shown in phantom). This arrangement is well known among those skilled in the inflator art. It is described, for example, in U.S. Pat. No. 4,902,036 of Zander et al., entitled DEFLECTOR RING FOR USE WITH INFLATORS FOR PASSIVE RESTRAINT DEVICES, the disclosure of which is incorporated herein by reference.

As shown in FIG. 1, assembly 10 comprises an inner cup-shaped member 14, having a base, a circular sidewall coextensive with the base and formed integral therewith and an open top to facilitate loading with a mixture of ignition enhancing and autoignition material. Cup member 14 is sealed by lid 16 as described below. Cup/lid assembly 14, 16 is partially surrounded, as shown, by outer, cup-shaped member 18 configured in a like manner to cup member 14 with a base, a circular coextensive sidewall found integrally therewith and an open top. Assembly 10 is thus retained in an inverted position directly atop pyrotechnic squib 20 (shown in phantom) such that an upper portion of squib 20 contacts a portion of lid 16. Lid 16 is preferably recessed as shown to accommodate an upper portion of squib 20.

In an alternate arrangement, assembly 10 may be supported within ignition chamber 12a by means well-known in the art, such as a retaining clip (not shown) which is press fit within the diffuser portion of the inflator housing between assembly 10 and squib 20.

Inner cup-shaped member 14 is preferably fabricated from a lightweight, corrosion resistant metal such as stainless steel. Alternatively, however, an even lighter weight metal material, such as aluminum, may be used in fabricating member 14 in order to further reduce the total weight of assembly 10. Member 14 thus forms a corrosion resistant container for pyrotechnic mixture 22 packaged therein. Mixture 22 preferably comprises, as discussed above, an ignition enhancing material such as boron potassium nitrate (BKNO$_3$) in combination with an auto-ignition material A preferred autoignition material for use with the present invention is a smokeless powder sold by E. I. DuPont De Nemours under the tradename IMR 4895. Applicants do not, however, intend to be limited to this particular material, since a variety of other pyrotechnic compositions, well known to those in the art, may be utilized in place of the preferred composition to achieve satisfactory results.

Mixture 22 is sealed within metal cup member 14 by lid 16 which is welded into position to close the open end of the cup. The seal formed by lid 16 thus permits the pyrotechnic mixture 22 to be hermetically stored within cup member 14 against atmosphere moisture. As discussed above, the contamination of mixture 22 with atmospheric water vapor in, for example, prior art packets formed typically from plastic, can slow and perhaps interrupt the ignition train leading to the combustion of the main propellant charge. In such an event, the performance of the corresponding inflator unit will likely be erratic and not up to required standards. Moreover, the use of stainless steel to form cup 14 prevents the welded assembly from being corroded due to external environmental influences, thus destroying the hermetic seal.

As further illustrated in FIG. 1, an inner portion 16a of lid 16 is preferably coined, i.e. made thinner than the surrounding lid portion, to make it easier for the hot gasses and particulates created upon the operation of squib 20 to burst through lid 16 and impinge upon pyrotechnic mixture 22 located within cup 14. Thus, mixture 22 remains hermetically sealed until the combustion products produced as a result of the ignition of squib 20 burst through coined portion 16a of lid 16, resulting in the combustion of mixture 22. The combustion products thus produced within assembly 10 thereafter burst through the walls of cup members 14, 18 and pass through ports 24 in the walls of diffuser member 12 to ignite the main propellant charge (not shown) located within the combustion chamber of the inflator device.

The sealed inner metal cup/lid assembly 14, 16 of assembly 10 is inserted by a friction fit within the open top end of outer cup member 18 such that the open ends of cup members 14, 18 both face in the same direction. In the preferred embodiment of the invention, cup member 18 is formed of plastic, preferably an engineering thermoplastic such as polypropylene, polyethylene or nylon as noted above, outer cup member 18 has the same general shape as inner member 14 except it is not sealed with a lid member. Plastic cup member 18 serves a two-fold purpose: (1) it acts to electrically isolate assembly 10 from stray electrical charges within the inflator housing. This prevents unintended ignition of the combustion material stored therein, thus avoiding premature actuation of the associated inflator unit, and (2) it serves to maintain an intimate contact between assembly 10 and squib 20. This is accomplished by making the overall height of assembly 10 larger than required for the space provided within the inflator housing and allowing for a compression gap 26 between metal cup member 14 and plastic cup member 18.

Thus, when assembly 10 is placed into the inflator device, cup members 14 and 18 are compressed together until squib 20 is seated against coined surface 16a of lid 16. This arrangement permits for larger tolerances to be used in manufacturing assembly 10 since each individual assembly 10 does not therefore need to be specifically dimensioned for a particular inflator and thus can be tailor fit within its corresponding inflator without a secondary operation.

Figure 2:
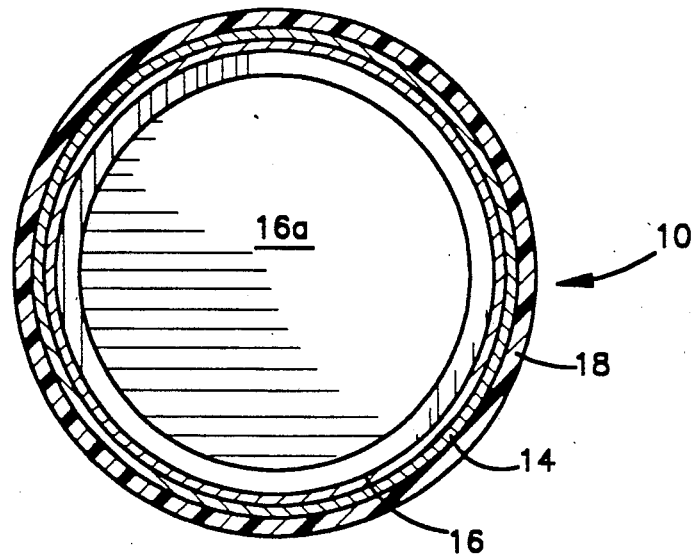
FIG. 2 is a view in cross-section through applicants, ignition material packet assembly, taken along line 2—2 of FIG. 1.

Turning now to FIG. 2 there is illustrated a sectional view through the assembly 10 of the present invention. Located at the outer periphery of assembly 10 is plastic cup-shaped member 18. Inwardly from plastic cup-shaped member 18 is metal cup-shaped member 14 which is hermetically sealed by lid 16. Lid 16 has a coined inner surface 16a as discussed above to facilitate burst-through by the hot gasses and particulates produced upon the ignition of squib 20.

Assembly 10 thus overcomes the drawbacks discussed above of prior art ignition packets. The hermetic seal obtainable with inner metal cup shaped member 14 is not obtainable with the use of all plastic ignition packets as used by some in the prior art, while the electrical insulation provided by outer plastic cup-shaped member 18 is not available with the use of prior art all-metal ignition packets which are capable of maintaining a hermetic seal.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

We claim:

1. An ignition material packet assembly which comprises:

a) first cup means adapted for electrically insulating a pyrotechnic material stored within said assembly, said first means having a base, a sidewall coextensive with said base and formed integrally therewith and an open top portion;

b) second cup means inserted at least partially within said open top of said first means, configured and adapted for storing said pyrotechnic material, said second means having a base, a sidewall coextensive with said base and formed integrally therewith and an open top portion;

c) a pyrotechnic material stored within said second cup means, adapted to produce a quantity of a gaseous combustion product upon ignition by initiating means located adjacent thereto; and d) a lid member closing said open top of said second cup means, said lid member adapted for sealing said pyrotechnic material within said second cup means;

said sidewalls of said first and second cup means being substantially circular in shape and the open tops of said first and said second cup means both facing in the same direction;

said first cup means being retained within said second cup means by a friction fit created therebetween and a compression gap being formed between said base of said first and said second cup means upon construction of said assembly to facilitate positioning of said assembly within a corresponding inflator device.

2. The assembly of claim 1 wherein said first cup means is fabricated from an engineering thermoplastic.

3. The assembly of claim 2 wherein said engineering thermoplastic is selected from the group consisting of polypropylene, polyethylene and nylon.

4. An ignition material packet assembly which comprises:
   a) a first cup-shaped member having a base, a circular sidewall coextensive with said base and formed integrally therewith and an open top portion, said first cup-shaped member being fabricated from an engineering thermoplastic to electrically insulate a pyrotechnic material stored within said assembly;
   b) a second cup-shaped member inserted within said open top portion of said first member, such that said open tops of said first and said second member both face in the same direction, wherein said second member is fabricated from a lightweight metal material and is retained within said first member by a friction fit created therebetween, and wherein a compression gap is formed between said base of said first and said second cup-shaped member upon construction of said assembly to facilitate positioning of said assembly within a corresponding inflator device;
   c) a pyrotechnic material stored within said second cup-shaped member and adapted to produce a quantity of a gaseous combustion product upon ignition by initiating means located adjacent thereto; and
   d) a lid member closing said open top of said second cup-shaped member, said lid member being welded to said sidewall of said second member to hermetically seal said pyrotechnic material therein, and comprising a coined portion to facilitate ignition of said pyrotechnic material upon actuation of said initiating means.

5. The assembly of claim 4 wherein at least part of said coined portion of said lid member is in contact relation with initiating means for igniting said pyrotechnic material within said second cup-shaped member.

6. The assembly of claim 5 wherein said initiating means is a pyrotechnic squib device.

7. The assembly of claim 4 wherein said pyrotechnic material comprises a mixture of an ignition g material and an autoignition material.

8. The assembly of claim 7 wherein said pyrotechnic material is in powdered form to provide a maximum available burning surface.

9. The assembly of claim 8 wherein said ignition enhancing material is $BKNO_3$.

10. The assembly of claim 8 wherein said autoignition material is a smokeless powder which ignites at a temperature substantially lower than that of said ignition enhancing material.

11. The combination of:
   a) an inflator for the generation of gas to inflate a motor vehicle passive restraint air bag, and
   b) an ignition packet assembly comprising
      1) a first cup-shaped member having a base, a circular sidewall coextensive with said base and formed integrally therewith and an open top, said first cup-shaped member being fabricated from an engineering thermoplastic to electrically insulate a pyrotechnic material stored within said assembly;
      2) a second cup-shaped member inserted within said open top of said first member such that said open tops of said first and said second members both face in the same direction, wherein said second member is fabricated from a lightweight metal and is retained within said first member by a friction fit created therebetween, and wherein a compression gap is formed between said base of said first and said second cup-shaped members upon construction of said assembly to facilitate positioning of said assembly within a corresponding inflator device;
      3) a pyrotechnic material stored within said second cup-shaped member and adapted to produce a quantity of a gaseous combustion product upon ignition by initiating means located adjacent thereto, said pyrotechnic material comprising a mixture of an ignition enhancing material and an autoignition material; and
      4) a metal lid member closing said open top of said second cup-shaped member, said lid member being welded to said sidewall of said second member to hermetically seal said pyrotechnic material therein and comprising a coined portion to facilitate ignition of said pyrotechnic material upon actuation of said initiating means.

* * * * *

UNITED STATES PATENT AND TRADEMARK OFFICE
CERTIFICATE OF CORRECTION

PATENT NO. : 5,046,429

DATED : September 10, 1991

INVENTOR(S) : Timothy A. Swann, et al.

It is certified that error appears in the above-identified patent and that said Letters Patent is hereby corrected as shown below:

Column 7, Line 46, Claim 7, change "g" to --enhancing--.

Signed and Sealed this

Twenty-ninth Day of December, 1992

*Attest:*

DOUGLAS B. COMER

*Attesting Officer*      *Acting Commissioner of Patents and Trademarks*